April 19, 1932. J. E. M. CHAMBERLAINE 1,855,096
TROLLING FISH LURE
Filed Dec. 11, 1930 2 Sheets-Sheet 1
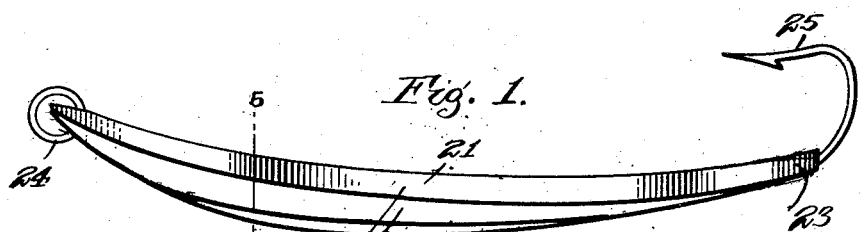
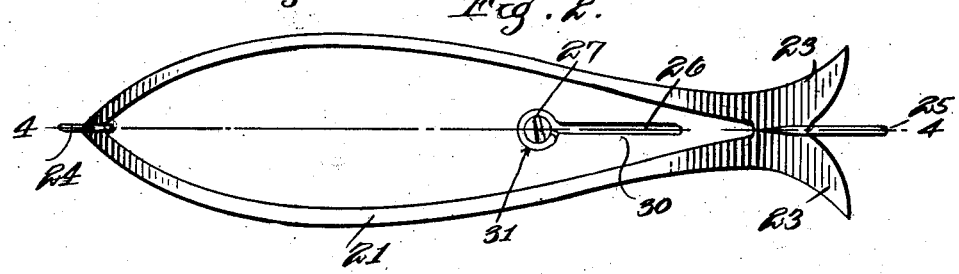
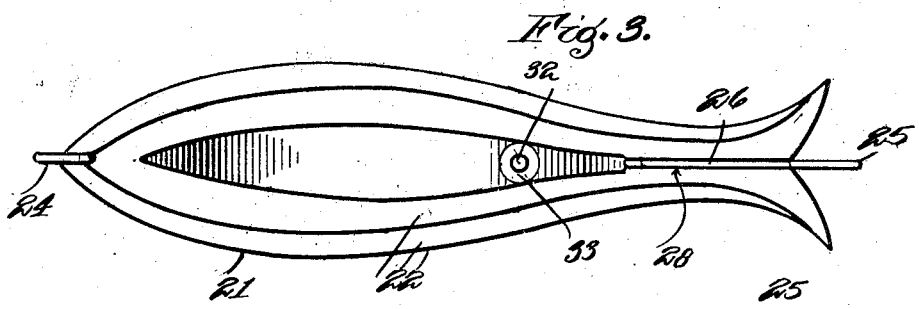
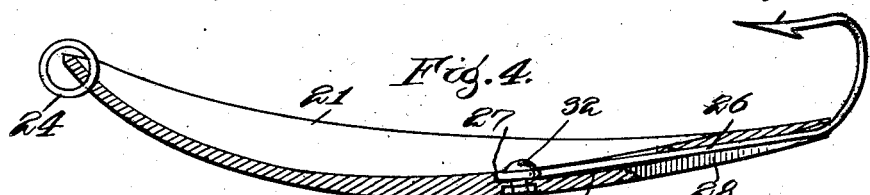
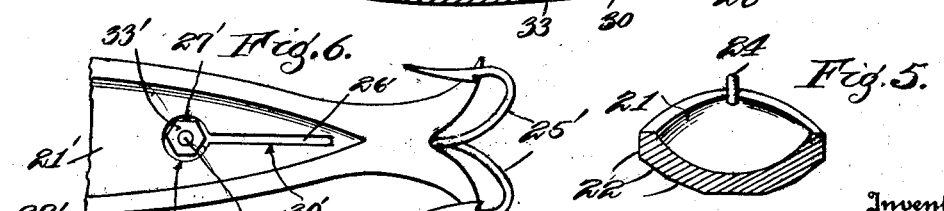
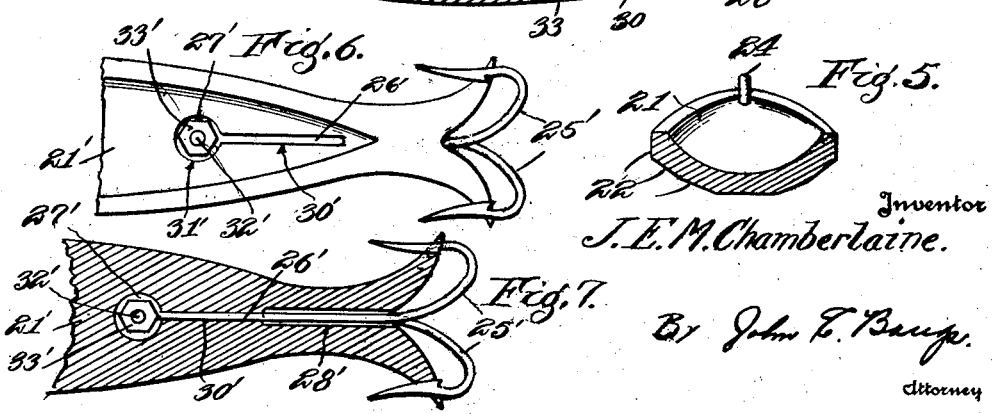
Inventor
J.E.M.Chamberlaine.
By John T. Baup.
Attorney

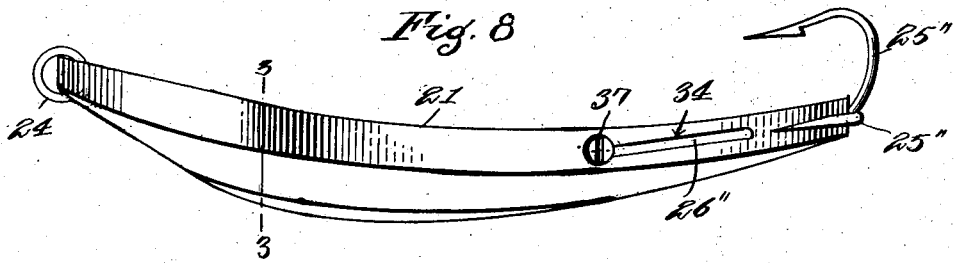
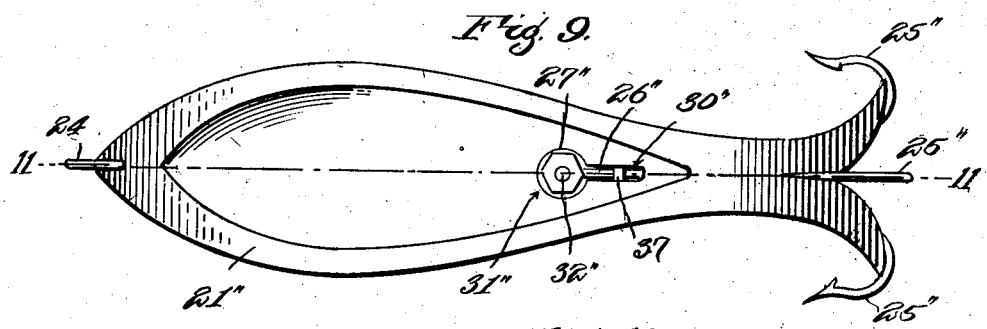
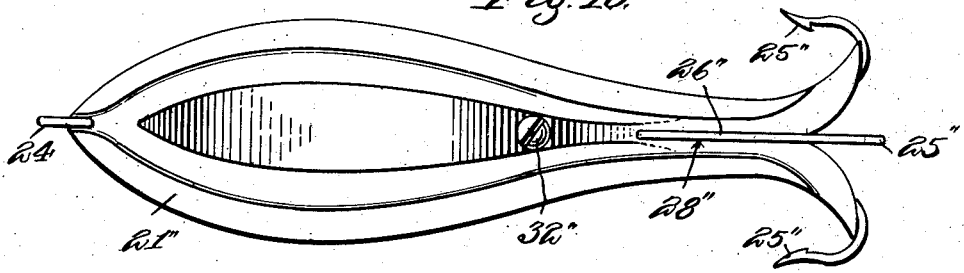
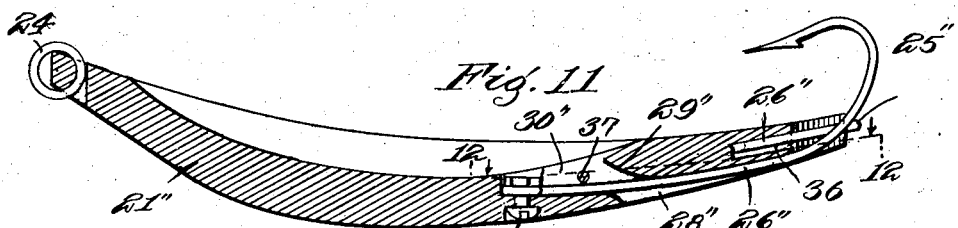
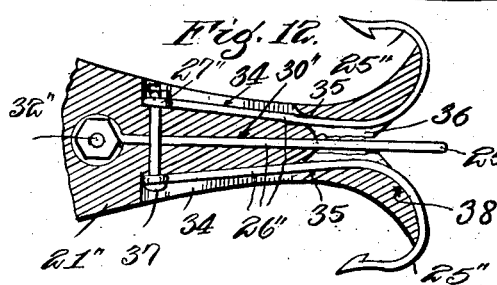

Patented Apr. 19, 1932

1,855,096

UNITED STATES PATENT OFFICE

JOSEPH E. M. CHAMBERLAINE, OF BALTIMORE, MARYLAND

TROLLING FISH LURE

Application filed December 11, 1930. Serial No. 501,649.

This invention appertains to improvements in fish lures or artificial bait generally and more particularly to types thereof for the catching of fish by trolling.

An object of the invention is to provide a lure of the class set forth, which is of an arrangement, construction and design to closely resemble a live fish, in general appearance and motion, when trolled through a body of water, with the added effectiveness of attracting nearby fish to the same by glittering and flashing light rays by reflection, during its forward trolling movements.

Another object of the invention is to make the improved lure of metal, in different sizes and weights, whereby the use of weighting sinkers may be entirely dispensed with, and, by the selection of a proper size and weight of lure, successful catches of fish can always be attained, whether the fish are running on or near the surface, or on the bottom, or in mid-water.

A further object of the invention resides in the provision of a means on each lure whereby dulled or broken hooks may be easily and readily removed and replaced from regular or standard stock.

A still further object of the invention has to do with the provision of a means for attaching one to three hooks on a fish lure body and in a manner that a maximum of protection is offered the attached hook or hooks against breakage, or other damage, or accidental displacement from predetermined operative position on the supporting body, while disposing them in highest effective relation to the latter to assure of the catch of a fish after its strike.

With the foregoing and other equally important objects and advantages in view, the invention resides in the certain new and useful combination, construction and arrangement of parts as will be hereinafter more fully described, set forth in the appended claims, and illustrated in the accompanying drawings in which:

Figure 1 is a side elevation of a single hook type of the improved lure,
Figure 2 is a top plan view,
Figure 3 is a bottom plan view,
Figure 4 is a vertical longitudinal section taken on the line 4—4 of Figure 2,
Figure 5 is a vertical transverse section taken on the line 5—5 of Figure 1,
Figure 6 is a fragmentary plan view of a two hook modification of the lure,
Figure 7 is a fragmentary horizontal section through the rear half portion of the form of lure as in Figure 6,
Figure 8 is a side elevation of a modified form of the lure, showing the manner of mounting three hooks in grouped arrangement thereon,
Figure 9 is a top plan view thereof,
Figure 10 is a bottom plan view of the same,
Figure 11 is a vertical longitudinal section taken on the line 11—11 of Figure 9,
Figure 12 is a fragmentary horizontal section taken on the line 12—12 of Figure 11, and
Figure 13 is a vertical transverse section taken on the line 13—13 of Figure 8.

Referring to the drawings, wherein like characters of reference designate corresponding parts in the several co-related views thereof, and more particularly to Figures 1 to 5 inclusive, the embodiment of the invention, as shown therein by way of example only, is preferably constituted in a metallic body 21, generally in the form of a fish in plan and arcuate in vertical section, with its upper side hollowed out or concaved substantially throughout its length and its lower side, together with its opposite sides, formed to provide a series of angled surfaces 22 extending in the longitudinal direction thereof.

The forward end or head portion of the body 21 has its opposite sides and bottom converging on curved lines to an approximate point in the plane of its longitudinal center, with a general curvature in an upward direction of a greater sharpness than the rear end or tail portion, in order to offer a minimum of resistance to the water during trolling movements, while the latter portion is somewhat flattened and oppositely and outwardly flared to form approximately a caudal fin 23. The concavity in the upper side of the body gradually decreases in depth toward the rear end thereof and finally merges into the substantially flattened upper surface of the caudal fin or tail portion 23.

A member, such as a ring or the like 24, is mounted in the pointed end aforesaid of the head portion of the body 21 to facilitate the attachment of a trolling line thereto.

The single-hook member, to be employed in this form of the lure, has its attaching eye 27, at the end of the shank portion 26 opposite the hook end 25 thereof, preferably arranged at right angles to the latter, and this eye end of the shank is to be inserted inwardly of a groove or slotway 28, formed in the lower side of the tail portion of the body, to and through a passageway 29 and into a connected groove or slotway 30 formed in the upper surface of the hollowed out or concaved portion aforesaid.

This passageway 29 inclines upwardly and forwardly through the body 21, between its points of connection with the grooves or slotways 28 and 30, so that the hook 25 must be turned sidewise in order to allow the eye portion 27 to traverse the same and thereafter be turned to vertical position, when the return bent or pointed end portion will project forwardly over the tail portion in the plane of the longitudinal center of the body 21, and its eye 27, now disposed horizontally of the body, will seat in a circular depression 31 formed in the surface of the upper concaved side of the latter for securement therein by a suitable fastening means.

This passageway 29 may be employed with or without the grooves 28 and 30, depending upon the thickness of the metal from which the body 10 is made, and, in either case, by having it to open through the body in the manner stated, it is somewhat elongated longitudinally of the body and its transverse width is sufficient only to permit of the insertion of the shank portion 26 of the hook member therethrough, so that it acts to hold the latter substantially rigid when the eye portion 27 is turned to horizontally secured position.

As shown, the aforesaid fastening means is preferably in the form of a machine screw or the like 32, which is passed downwardly through the eye 27 and an opening alined therewith for engagement with a nut 33 at the lower side of the body 21. This nut 33 is preferably countersunk into the body in order to have its lower face and the engaged end of the screw 32 disposed flush with the bottom surface thereof. By this arrangement of the nut 33, and making use of a rounded screw head, no resistance will be offered to the otherwise free trolling movements of the lure.

In the form of the invention, as shown in Figures 6 and 7, two hooks 25' are employed and the shank portions 26' and the eye portions 27' thereof are to be seated in the grooves or slotways 28' and 30' and the circular depression 31', as in the first instance. Here, the shank 26' and the eye 27' of one hook 25' will, however, overlie the other and both eyes will be engaged by the fastening or screw 32'. When properly secured in place, the hooked portions 25' will be oppositely and outwardly angled in an upward direction, with the pointed end portions thereof disposed above the extreme outer ends or tips of the caudal fins 23'.

In order to effectively secure the two hooks 25' in place, the fastening or screw 32' is preferably reversed, from that of the single hook type of lure hereinbefore described, with its threaded end uppermost and engaged with the alined openings in the body 21' and the eyes 27', so that a relatively thin nut 33' may be employed therewith and caused to seat against the uppermost eye and within the depression 31' with its upper face flush with the surrounding surface of the body.

Referring now to Figures 8 to 13 inclusive, the embodiment of the invention therein shown employs three hooks 25" in grouped arrangement about the tail portion of the lure body 21", and here one hook is mounted in the plane of the longitudinal center of the body, after the manner of the mounting of the single hook 25 in the first instance, i. e., the shank portion 26" being engaged in the alined grooves or slotways 28" and 30" and the passageway 29" connecting the same, and the eye portion 27" in a circular depression 31" in the upper concaved side of the body at the forward end of the groove or slotway 30". A fastening 32", preferably arranged in the body 21" after the manner of the fastening 32' in the second instance of the invention, is likewise employed to secure the eye portion 27" in place within the depression 31".

In order to mount the two remaining hooks 25" in place, one at each side of the central hook aforesaid, a slotted opening 34 is formed in each vertical side wall portion of the body 21" toward the forward end of the tail portion of the latter and is connected by a rearwardly and inwardly directed passageway 35, which opens in a recess 36 formed in the central part of the rear end wall of the tail portion, as is best shown in Figure 12.

These slotted openings 34, the passageways 35 and the recess 36 are arranged in the body 21″ in a horizontal plane above that of the central groove or slotway 28″, in order to allow quick and easy removal and replacement of any one of the hooks 25″ without interference with the others, whenever that is desired or necessary.

The slotted openings 34 terminate at their forwardly directed ends in circular depressions, which are disposed in alinement transversely of the body 21″ and are connected by an opening for the reception therein of a bolt fastening 37 to be also engaged through the eyes 27″ of the outer hooks 25″. When properly secured in position, the headed end of the bolt 37 and the securing nut therefor are preferably housed within the depressions, substantially as is shown.

In order to provide a sufficient amount of clearance for the insertion of the shanks 26″ of the outer of the hooks 25″ inwardly of the recess 36 and forwardly of the passageways 35 and the slotways 34, the rear faces of the caudal fins 23″ are preferably grooved, as at 38, outwardly from the recess 36, so that the eye end of the shanks thereof may be disposed at a proper angle for the purpose. When in place, the inner curved portions of the hooks will seat in the grooves 38, while the outer curved portions thereof will extend about the tips of the fins 23″ and the pointed ends forwardly from the tips in spaced relation to the adjacent sides of the body 21″.

In this grouped arrangement of the three hooks 25″, it will be comprehended that the outer of the same are supported in sidewise relation to the body 21″, whereby the hooked ends thereof will be in substantially right angular relation to the hooked end of the central hook and the points of all hooks will extend in a forward direction in substantially parallel relation one with respect to the other; the spacing of the pointed ends being such that a fish will be hooked regardless of the angle of strike of the fish at the tail portion of the lure.

By making the lures of different weights of metal, the same can be interchangeably employed for trolling on the surface of a body of water or at any depth therein, as has been hereinbefore suggested, and by giving the same a highly polished finish, they will glitter and flash during trolling movements, the glittering and flashing effects thereof being augmented by the angled outer faces or facets formed on the outer and lower sides of the bodies.

Without further description, it is thought that the features and advantages of the invention will be readily apparent to those skilled in the art, and it will of course be understood that changes in form, proportion and minor details of construction may be resorted to, without departing from the spirit of the invention or its scope as claimed.

What is claimed is:

1. In a lure of the class described, a comparatively heavy weight metal body of true fish form in plan, line attaching means at the head end of said body, said body having a central passageway formed through the same forwardly of the tail end portion thereof, and a hook having its shank portion passing forwardly through the said passageway for its securement to and substantially flat against the upper side of said body and in a manner that its hooked end extends immediately upward from beneath the rear end of the body, with the pointed end thereof projecting forwardly of the latter end of the body in spaced relation thereto, the selected weight of said body acting to determine the depth of effective operation of the lure in a body of water.

2. A lure as set forth in claim 1, wherein the body is concavo-convex substantially throughout its length and with the said passageway opening into the concavity, and the shank portion of the hook is substantially housed in grooves extending forwardly and rearwardly from the opposite ends of the passageway.

3. The lure as set forth in claim 1, wherein the said body is substantially in the form of a fish, with a caudal fin formation at its rear end curving in a rearward and upward direction therefrom to conform to the bend in the hook connecting portion of the shank of the hook and in a manner to act as a guard thereto.

4. In a lure of the class described, a solid metal body of substantially longitudinal arcuate form, line attaching means at the forward end of said body, the rear upwardly curved end portion of said body having the form of a caudal fin, said body having a passageway opening through the same just forwardly of the said caudal fin and grooves extending forwardly and rearwardly therefrom in the upper and lower sides respectively of the body, hooks having their shank portions inserted forwardly through the said passageway and seated in superimposed relation in the said grooves with the hooked ends thereof extending in oppositely inclined relation above and forwardly of the rear end of said body and from between the oppositely diverging portions of the said caudal fin, and means for commonly securing the attaching eye ends of said hooks to said body.

5. In a lure of the class described, a solid metal body of substantially longitudinal arcuate form, line attaching means at the forward end of said body, the rearwardly curved end of said body having a passageway through the same and grooves extending forwardly and rearwardly therefrom in the upper and lower sides respectively of the body, a hook having its shank portion inserted forwardly through the said passageway and seated in the said grooves with the hooked end thereof extending upwardly and forwardy of the rear end of said body, means for securing the forward end of the said shank to said body, said body also having passageways leading forwardly from the center of the rear end and opening outwardly of the opposite sides thereof, hooks having their shank portions inserted forwardly through said last named passageways and their hooked ends projecting angularly in opposite directions with respect to said first named hook, and another means extending transversely of said body for commonly securing the attaching eyes of the last named hooks in place.

In testimony whereof I affix my signature.

JOSEPH E. M. CHAMBERLAINE.